US008682477B2

(12) United States Patent
Christy et al.

(10) Patent No.: US 8,682,477 B2
(45) Date of Patent: Mar. 25, 2014

(54) APPARATUS AND METHOD FOR INVENTORY MANAGEMENT AND AUTOMATED DISCHARGE OF TREATED SEWAGE SLUDGE TO TRUCKS

(71) Applicants: Richard W. Christy, Eagleville, PA (US); Michael Quici, Ambler, PA (US); Louis Litz, Ambler, PA (US)

(72) Inventors: Richard W. Christy, Eagleville, PA (US); Michael Quici, Ambler, PA (US); Louis Litz, Ambler, PA (US)

(73) Assignee: RDP Technologies, Inc., Norristown, PA (US)

( * ) Notice: Subject to any disclaimer, the term of this patent is extended or adjusted under 35 U.S.C. 154(b) by 0 days.

(21) Appl. No.: 13/933,447

(22) Filed: Jul. 2, 2013

(65) Prior Publication Data

US 2013/0294882 A1  Nov. 7, 2013

Related U.S. Application Data

(62) Division of application No. 13/027,640, filed on Feb. 15, 2011, now Pat. No. 8,504,190.

(51) Int. Cl.
*G06F 7/00* (2006.01)
*G06F 17/00* (2006.01)
*B01D 21/24* (2006.01)

(52) U.S. Cl.
USPC ........... 700/218; 700/240; 700/241; 700/213; 700/239; 210/104

(58) Field of Classification Search
None
See application file for complete search history.

(56) References Cited

U.S. PATENT DOCUMENTS 4,079,003 A * 3/1978 Manchak .................. 588/313
6,092,745 A * 7/2000 Seymour et al. ............. 239/675
6,447,674 B1 * 9/2002 Simon et al. ................. 210/104

* cited by examiner

*Primary Examiner* — Yolanda Cumbess
(74) *Attorney, Agent, or Firm* — Paul & Paul

(57) ABSTRACT

A method and apparatus is provided for the automated discharge of treated sewage sludge to trucks, via inventory management by tracking the flow of sludge from bins in which it is located to trucks, on a first-in/first-out basis, including automated truck positioning, automated precision truck loading and monitoring and controlling the various interrelated components via a PLC computer program.

8 Claims, 13 Drawing Sheets

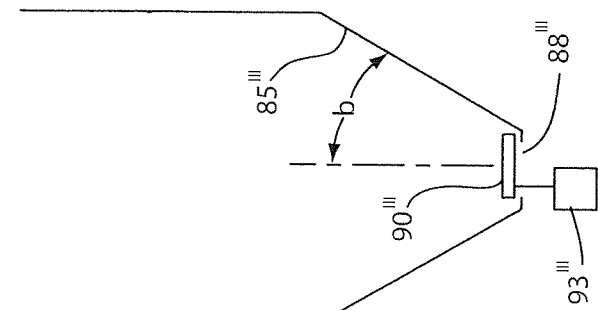
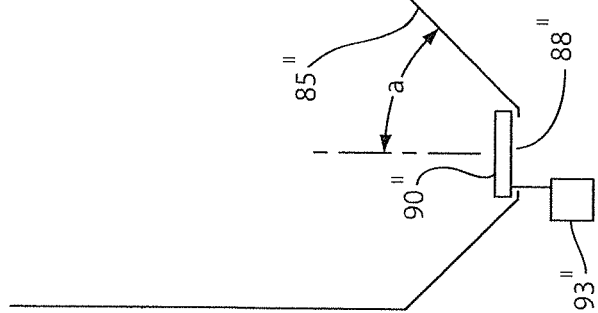
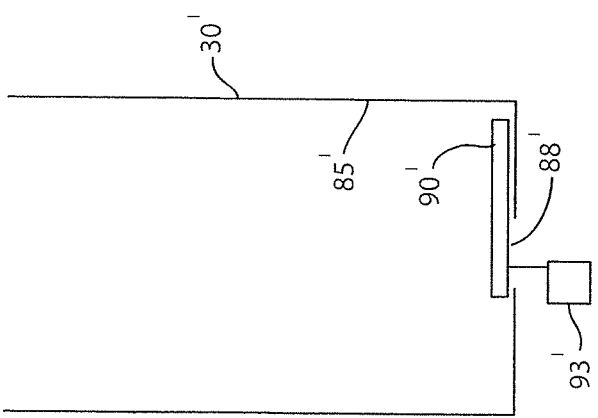
Fig. 5C
Fig. 5B
Fig. 5A

APPARATUS AND METHOD FOR INVENTORY MANAGEMENT AND AUTOMATED DISCHARGE OF TREATED SEWAGE SLUDGE TO TRUCKS

CROSS-REFERENCE TO RELATED APPLICATION

This is a divisional of U.S. application Ser. No. 13/027,640, filed Feb. 15, 2011.

BACKGROUND OF THE INVENTION

The present invention is directed to a method and apparatus for the inventory and management and automated discharge of treated sewage sludge to trucks, and includes inventory management by tracking the flow of sludge from bins to trucks on a first-in/first-out basis, automated truck positioning, automated precision truck loading and an operating system program for monitoring and controlling all of the inter-related components.

In the treatment of sewage sludge so that it can meet the various criteria of the U.S. Environmental Protection Agency, so that the sewage sludge can be returned to the earth as fertilizer, or in some cases be used as ground fill, it has become commonplace that the sludge is first treated to remove pathogens, or at least reduce the pathogens in the sludge to an EPA acceptable level and to reduce the attractiveness of the sludge to vectors such as rats, mice, flies, etc., as well as to reduce the odors that may otherwise emanate from the sludge. In some cases, the treatment to kill pathogens is by heating the sludge to a high temperature for a period of time. In other cases, the sludge is treated by a process of pasteurization to neutralize pathogens and to reduce vector attractiveness. Often, both heat and pasteurization are employed. In many cases, the treatment involves lime stabilization, to elevate the pH of the sludge to a sufficient degree for a pre-determined period of time. Such a treatment often involves the addition of an alkaline substance such as calcium oxide, calcium carbonate and/or compounds such as quicklime, lime kiln dust, cement kiln dust or dolomitic lime. The sludge generally has both solid and liquid components. Often, the sludge is dewatered to produce a higher solids content. The solids content of the sludge can vary, such that the physical characteristics of the sludge can range from a viscous, colloidal liquid to a dry cake or clay-like texture.

Some of the methods and apparatus for treating sludge, to which the present invention is addressed in terms of an automated discharge of treated sewage sludge into trucks include the following patents, all of which are herein incorporated by reference:

| | |
|---|---|
| 5,013,458 | 5,186,840 |
| 5,229,011 | 5,346,616 |
| 5,401,402 | 5,405,536 |
| 5,433,844 | 5,554,279 |
| 5,618,442 | 5,681,481 |
| 5,783,073 | 5,851,404 |
| 7,669,348 | 7,416,673 |

In accordance with the present invention, dewatered sludge is delivered to a conveyor device that can be any of various types, such as a belt conveyor, a screw conveyor, a pump for pumping sludge through a duct or tube, or any other conveyor devices that supplies sludge to a gravity flow bin. Preferably, a plurality of conveying devices are used, each supplying sludge to a different gravity flow bin. One such apparatus for delivering dewatered sludge to a conveyor mechanism for, in turn, delivering sludge to one or more gravity flow bins, is disclosed in U.S. Pat. No. 6,447,674, the complete disclosure of which is herein incorporated by reference.

Generally, dewatered biosolids (sludges) have, by their nature, a resistance to flow because water has been removed and flocculants, generally of polymeric material have been added to thicken the sludge by adsorbing onto sludge particles to aggregate the sludge particles. During the treatment of the sludge, calcium has been added to the sludge to reduce pathogens, and the polymeric material has also been added to the sludge in order to provide flocculation. By adding a flocculant, the sludge develops a consistency similar to that of cottage cheese, and then the sludge is squeezed to reach a semi-solid appearance, having about 20% solids, with the rest being water.

In some cases, simply opening a bottom gate of the flow bin is enough to initiate flow, as gravity takes over. In other cases, the resistance to flow and/or the wall friction exceeds the force of gravity, particularly when the quantity of sludge in the flow bin is reduced, thereby reducing the "head" of sludge in the bin. When gravity flow bins are fully loaded, there is a greater amount of "head", facilitating the unloading of the bin when the bottom gate is opened. However, if the bin is only slightly full, the sludge may have formed as "cake", perhaps having remained in the bin for a couple of days without any sludge having been removed from the bin in that period, and gravity flow may not as easily occur.

THE PRESENT INVENTION

In accordance with this invention, one feature of the flow bins is that they are constructed to allow for mass flow, such that when a bottom gate of the bin is opened, flow initially proceeds on a first in-first out basis that is steady and controlled, reducing the opportunity for portions of the sludge in the bin to become stagnant that could lead to re-growth of bacteria, viruses, etc., resulting also in production of undesirable odor.

The present invention also allows for controlling the discharge opening at the bottom of the bin, by controlling the rate of opening and closing, preferably by software control of an operational computer. The control of the bottom opening of the bin may be via the use of a slide gate and its sealing system, constructed in accordance with U.S. Pat. No. 6,698,766, the complete disclosure of which is herein incorporated by reference.

The discharge from the bins may be via complete gravity flow, or via gravity flow assisted by a positive displacement of sludge at the bottom of the bin via a reclaim arm or other scraping mechanism that is rotationally driven at the bottom of the bin, in order to engage sludge at the bottom of the bin and draw the same to a central discharge location, to assist in keeping the biosolids (sludge or cake) evenly moving out of the bin, and for facilitating the flow of sludge along walls of the bin.

Additionally the amount of biosolids in a bin at any given time may be accurately determined by the use of load cells, which support the bin, and provide the computer with a measure of the weight of the bin plus the weight of the sludge or biosolids in the bin. The system also permits measuring the rate at which there is a loss of weight and enables the developing of a factor called a "K" factor to determine an increase in speed of the reclaim arm or other scraping mechanism via a variable speed drive, to offset the friction against the sludge from the walls of the bin. The computer can monitor that rate of change and adjust the speed of the reclaim arm or other scraping mechanism to maintain the mass flow rate. Since the weight of an empty bin will be a known quantity, a measurement of the weight of both the bin and the sludge therein will provide the computer at any given time with a measure of the actual amount of sludge that exists within the bin in order to offset the effect of reduced "head" of sludge in the bin when the level of sludge in the bin is low. The load cells measure the rate of loss of weight from sludge that is being delivered into the truck to develop the "K" factor.

In accordance with this invention, trucks for carrying away the sludge or biosolids can enter a location beneath preferably a series of multiple bins, being directed into position based upon a computer control, operating under a selected operating protocol. The controlling system can direct the truck to a position beneath one or more bins, for discharge of biosolids sludge into the truck bed. In such a system, the driver can select the desired weight of sludge that is desired to acquire, by so informing the computer. The truck is then bedded-in and filled to a predetermined set point (weight). When such a set point is reached, the computer can control the direction and timing of movement of the truck from beneath the bin or bins with respect to which the truck is located, and if the system is in a garage, the computer can direct the opening of a garage door for exiting the truck, and for opening another garage door, if desired, for entry of a second truck. Such control can include the use of sensors, signals, motor actuators, switches and the like.

The computer can also control the opening of bin discharge gates at the bottoms of the bins, preferably also controlling the speed of opening and closing of the discharge gates.

The computer can also be programmed to detect the level of biosolids sludge in each of the bins, at any given time, via level sensors of a mechanical, ultrasonic, infrared, or other detection types, and can then signal to a conveyor disposed above the upper end of the bin, to actuate a discharge of sludge from the conveyor, into a bin, to bring the level of biosolids sludge into the bin up to a desired, preferably maximum level.

The control of the amount or percentage of opening and closing of the discharge gate at the bottom of a bin enables the reduction or minimization of amount of splashing and splatter of the discharge of the biosolids sludge that is released from the bin, which, if not controlled, could discharge sludge from the bin at a rate up to 5,000 gallons per minute. Controlling the discharge of sludge from the bin facilitates mass flow of the sludge from the bin and avoids equipment damage, such as, avoiding the rapid discharge of too much sludge into the bed of a truck at any given time, that may damage the truck, for example, by breaking an axle on the truck, because of an undesirable massive flow of sludge too fast into the bed of the truck. The control of the sludge discharge from the bin is a function of the amount or percentage of opening or closing of the discharge gate.

Also, by controlling the opening and closing of the garage doors, odors from the sludge can be contained within the garage, rather than entering the outside environment.

OBJECTS OF THE INVENTION

In the paragraphs above under the subheading "The Present Invention" there are described a number of objects of the present invention, both individually and collectively.

SUMMARY OF THE INVENTION

The present invention is therefore directed to a method and apparatus for an automated control of and discharge of treated sewage into beds of trucks.

BRIEF DESCRIPTION OF THE DRAWING FIGURES

FIG. 1 is a longitudinal sectional view, taken through a garage, in which trucks may enter from the right and leave from the left, directed to a position beneath one or more sludge bins, for receiving sludge discharged from the bottom of one or more bins, and with conveyor devices disposed above the bins, for filling the bins with biosolids sludge, for later discharge into beds of trucks, directed by a programmed, software-controlled computer that is fed information from various sensors, and which, in turn activates other sensors, for control of the truck filling operation.

FIG. 5A is a schematic illustration of an alternative bin having vertically straight sidewalls with a reclaim arm of the type illustrated in FIG. 5, for discharging sludge through a central opening of the bin.

FIG. 5B is an illustration like that of FIG. 5A, but wherein the lower end of the bin is at an angle "a" to the vertical.

FIG. 5C is an illustration like that of FIG. 5B, wherein the angle "a" is at a different angle than that of FIG. 5B.

DETAILED DESCRIPTION OF THE PREFERRED EMBODIMENTS

Figure 1:
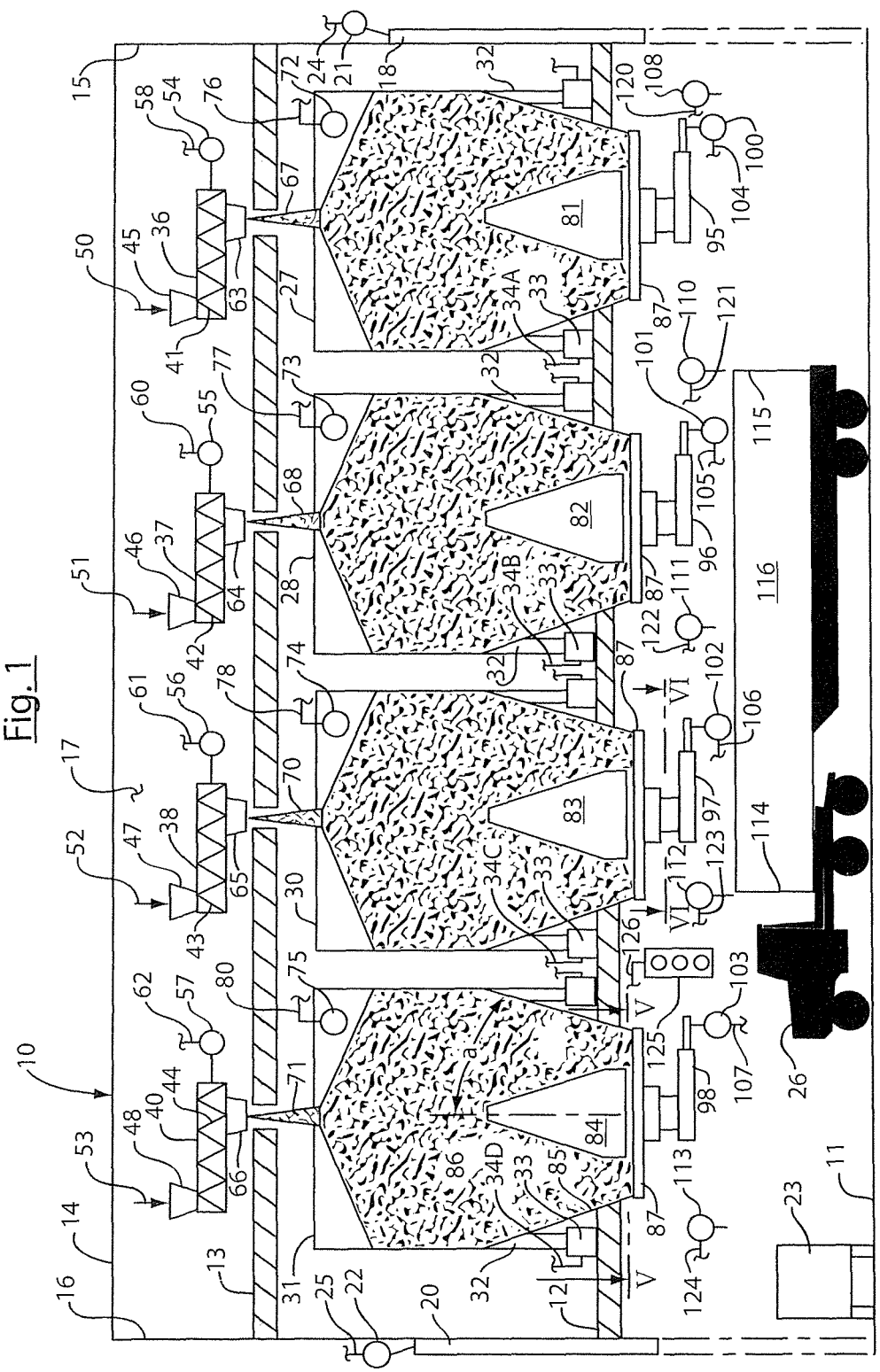

Referring now the drawings in detail, reference is first made to FIGS. 1-4, in which a garage, warehouse, or similar structure 10 is illustrated, having a ground level floor 11, a higher floor 12, an even higher floor 13, a roof 14, right and left end walls 15 and 16, respectively, a near wall (not shown), and a far wall 17.

Right and left openable doors 18, 20 are located in end walls 15, 16, respectively, shown in full lines in the open position, with lower ends thereof being shown in phantom position, as closed doors. The doors 18, 20 each have motorized opener mechanisms 21, 22, respectively, operable upon actuation from a computer 23, via electrical or other control lines 24, 25, respectively. It will be understood that the opening and closing of the doors 18, 20 is to permit entry and exit of a truck 26, driven into the garage 10.

Between the floors 12, 13 of the garage 10, there are a plurality of storage bins 27, 28, 30 and 31. In FIG. 1, there are four storage bins illustrated, although it will be understood that in the system disclosed herein, there could be a fewer number of bins, or a greater number of bins, as the operator of the facility may desire.

Each of the bins 27, 28, 30, 31 is supported on a plurality of generally vertically disposed support legs 32, that, in turn, are supported on load cells 33. The load cells are weight-responsive and are mounted on the floor 12 and are electrically connected to the computer 23 via signal control lines, which signal control lines are designated 34A for bin 27, 34B for bin 28, 34C for bin 30, and 34D for bin 31.

The load cells may be constructed as are the load cells in U.S. Pat. No. 7,669,348, or any one or more of U.S. Pat. Nos. 5,770,823; 4,064,744; 4,166,997; 4,454,770 and 5,313,022, the complete disclosures of which are herein incorporated by reference.

The load cells 33 provide the computer 23 with information as to the weight of the bin with which the load cells are associated, together with the weight of the biosolids or sludge in that associated bin. Because the weight of the bin itself is a known, predetermined quantity, and because the computer 23 is programmed to subtract the weight of the bin with which any group of associated load cells is associated, the computer can readily determine the weight of the biosolids or sludge in that particular bin, with which that group of load cells is associated.

Figure 7:
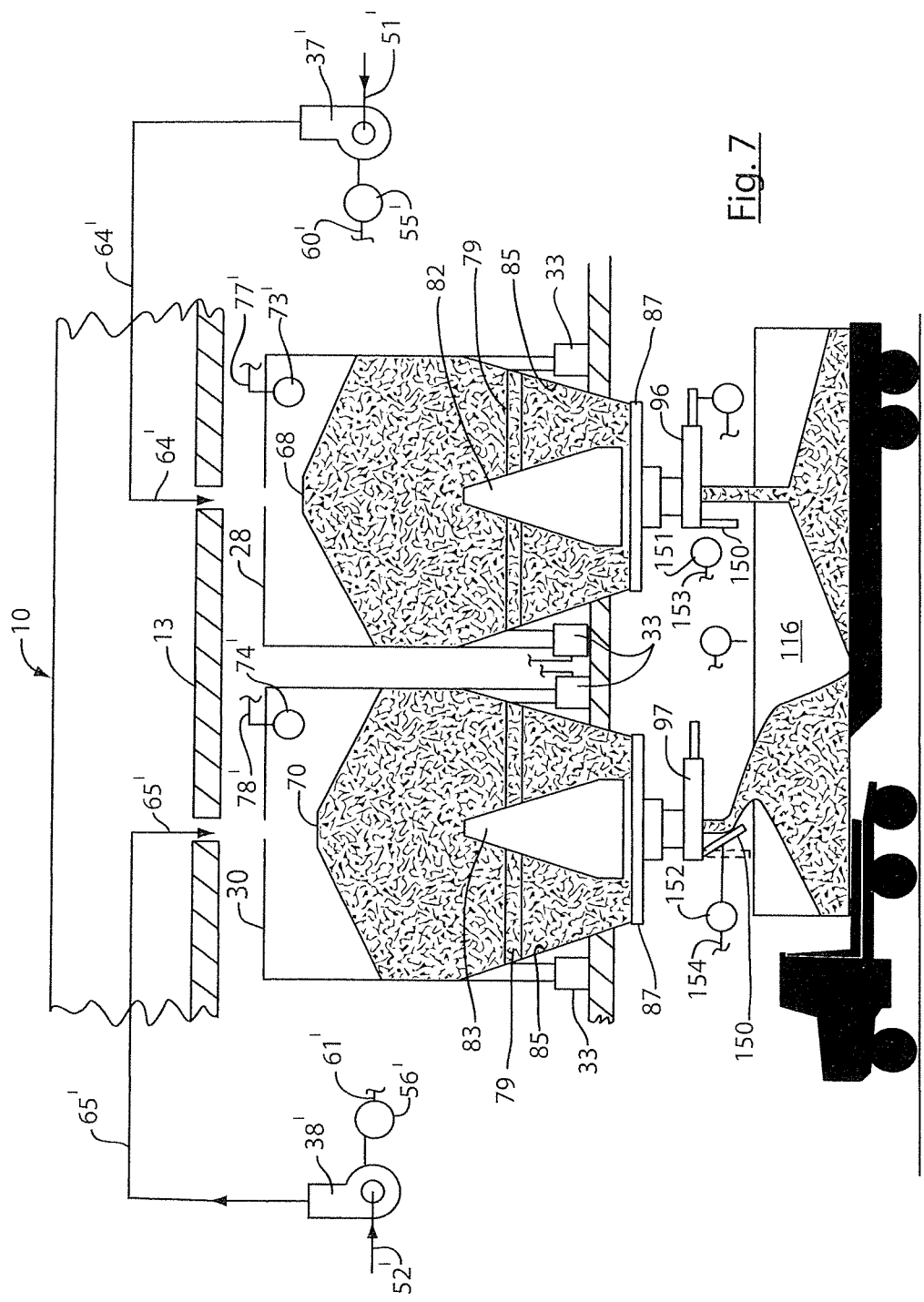
FIG. 7 is a fragmentary illustration of some of the components of FIGS. 1-4, with alternative pump type conveyors of sludge to bins and with deflector mechanisms at the bin discharge locations for deflecting sludge to other locations within the truck bed, also computer controlled.

Above the upper floor 13 of the garage 10, there are located a plurality of conveyors 36, 37, 38, and 40, each having a preferably helical screw auger 41, 42, 43 or 44 respectively therein, as illustrated in FIGS. 1-4, or pumps, 37', 38' with associated conduits 64', 65' as illustrated in FIG. 7, for conveying biosolids sludge that has previously been delivered to the conveyor devices from a dewatering device (not shown) that, in turn, either continuously or periodically delivers dewatered sludge to an opening 45, 46, 47 or 48 of the conveyor device, as shown by the arrows 50, 51, 52 and 53 of FIG. 1-4, or 51', 52' of FIG. 7.

The augers 41-44 of the conveyors 36, 37, 38, 40 or pumps 37', 38' are operated by respective motor/controllers 54, 55, 56 and 57 of FIG. 1-4 or 55', 56' of FIG. 7 that are, in turn, controlled via the computer 23 operating through associated electrical or other control lines 58, 60, 61 and 62, or 60', 61' to facilitate discharge of biosolids sludge from conveyor exit chutes 63, 64, 65 and 66, or 64', 65' respectively, to discharge biosolids sludge through openings in the floor 13, which openings are located to dispense biosolids sludge 67, 68, 70 and 71, respectively, into generally central locations of the associated, respective bins 27, 28, 30 and 31, as dictated by signals from the computer 23 to the controllers 54, 55, 56, 57 or 55' and 56'.

The computer 23 can call for the dispensing of biosolids sludge from any of the conveyors 36, 37, 38 or 40, or pumps 37', 38' depending upon the computer operating on the basis of information provided to it via the load cells 33, based upon a reduced weight of biosolids sludge in any particular bin 27, 28, 30 or 31. Additionally, the computer 23 can dictate the control of a motorized actuator controller 54, 55, 56, 57, 55' or 56', for dispensing biosolids sludge from a given conveyor 36, 37, 38, 40, 37' or 38' depending upon the detection of a reduced volume of biosolids sludge in any given one or more of the bins 27, 28, 30 or 31, as recognized by an associated sensor 72, 73, 74, 75, 73' or 74' disposed at an upper end of an associated bin 27, 28, 30 or 31, preferably near a side wall thereof, based upon a signal provided by a sensor 72, 73, 74, 75, 73' or 74' delivered to the computer 23 via an electrical or other signal line 76, 77, 78, 80, 77' or 78'.

The upper sensors 72, 73, 74, 75, 73', 74' can be ultrasonic sensors, infrared sensors, mechanical switching mechanisms, or any other type of sensors that may sense the level of biosolids sludge in that particular associated bin, preferably recognizing the level of biosolids sludge at a near-sidewall location within that bin.

Each of the bins 27, 28, 30, 31 is preferably generally cylindrical in construction, having tapered lower wall portions 85, although, if desired, at least the upper ends of the bins could be of rectangular or other construction, as may be desired. While, ideally the bins would have vertically straight sidewalls for free mass flow, the tapered lower wall portions 85 of the bins will be at a predetermined acute angle "a" to the vertical central axis 86 of its associated bin, that is less than about 45°±2°, and preferably within the range of 30°±2°, in order to facilitate mass flow of biosolids sludge out of the bin, through the bottom thereof. Such mass flow is the type of flow that occurs via gravity alone, without any other assist, with such gravity flow being on a first-in, first-out basis that is both steady and controlled. First-in, first-out flow is highly desirable, in that such precludes a stagnant build-up of biosolids sludge in a bin that could otherwise lead to build-up of odors and re-growth of bacteria or viruses in the sludge, as well as a loss of storage capacity. Accordingly, it is desirable that biosolids sludge in a given bin not accumulate on walls of the bin, but rather slide readily off of the side walls of the bins.

In the bins, there are, optionally, fixably mounted pressure relief conical structures or cones 81, 82, 83 and 84 carried from bin walls 85 via radial mounting struts 79, not illustrated in FIGS. 1-4, for the sake of clarity, but illustrated in FIG. 7. The conical structures facilitate the breaking up of biosolids sludge as such sludge travels through the bin, from the upper end, to a discharge location at a lower end thereof. Such conical structures 81-84 also preclude the formation of a dome of sludge within a bin, and shield the weight of sludge in the bin from moving parts such as a discharge arm or other moving mechanism.

Figure 5:
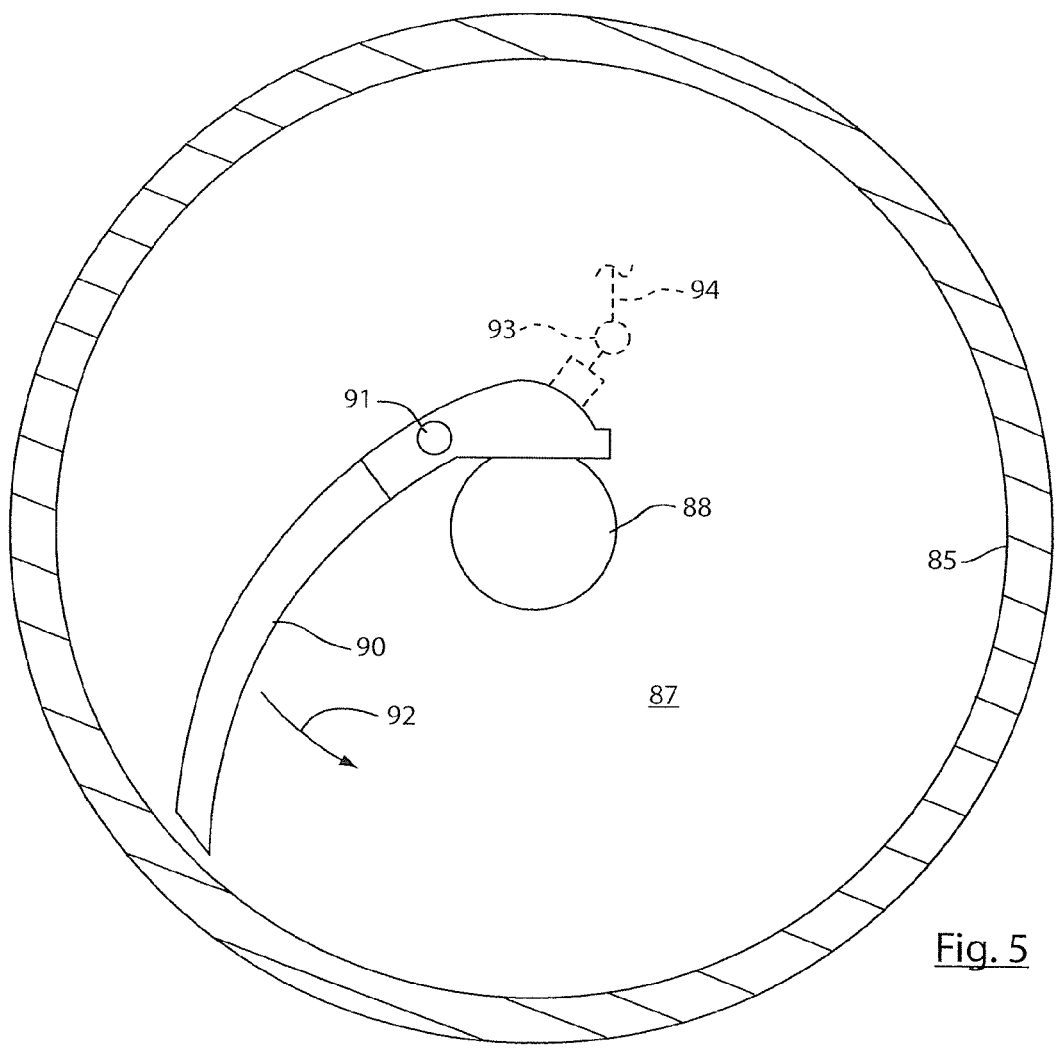
FIG. 5 is a transverse sectional view, taken through the left-most bin of FIG. 1, generally along the line V-V of FIG. 1, and wherein a reclaim arm in the form of a rotating plow is illustrated for directing sludge at the bottom of a bin into a central discharge area.

The bins 27, 28, 30, 31 are each provided with bottom floors 87 (see FIG. 5), each having a central discharge location 88 at the geometric center thereof. The discharge locations 88 are beneath the conical structures 81-84 in each of the bins.

Above the floor 87 of each of the bins, and below the conical structure 81, 82, 83 or 84 thereof, associated with that particular bin, there is provided a sythe-like positive displacement reclaim arm 90, shaft-mounted at 91 for variable speed rotational movement in the direction of the arrow 92, to sweep sludge that is at the bottom of the bin, across the floor 87, to a discharge location 88. The reclaim arm 90 is driven an appropriate motor 93, controlled as to its operation and rotational speed from the computer 23, via a suitable electrical or other control line 94. It will be understood that the reclaim arm 90 is optionally provided for the bins 27, 28, 30, 31, in that in many instances, the discharge of biosolids sludge from a bin may occur by means of mass flow; i.e. gravity only, not requiring the use of a reclaim arm 90. In other instances, the use of a reclaim arm 90 will be desirable and very effective. Other types of rotating discharge arms or other mechanisms may alternatively be used to facilitate discharge of sludge from the bottom of a bin. The variable speed of the discharge arm facilitates control of the rate of discharge, and therefore facilitates inventory management by enabling the discharge of sewage sludge on a first-in/first-out basis, to avoid an increase in pathogens that might otherwise take place, in order to have odor control, and so that the sludge will continue to meet Class B treatment in accordance with E.P.A. standards, which will prevent pathogen re-growth.

With reference now to FIG. 5A, the bin 30' has vertically straight side walls 85' for free flow of silage through the bin 30', and with the reclaim arm 90', driven via variable speed motor 93' being provided to facilitate discharge of sludge out central discharge location 88'.

In FIG. 5B, the bin 30" is provided, with lower side walls 85" being sloped at an angle "a", which is about 45°, for sliding of sludge therealong, and with a reclaim arm 90", driven by variable speed motor 93", for facilitating discharge of sludge from the bin 30" via the central discharge location 88".

In FIG. 5C, the bin 30''' has lower side walls 85''' at an angle "b", that is about 30°, for sliding of sludge therealong, and with the discharge of sludge therefrom being facilitated by a reclaim arm 90''', driven by variable speed motor 93''', for discharge of sludge out the central location 88''' thereof.

Each of the bins 27, 28, 30, 31 of FIG. 1 will have its discharge opening 88 opened, closed, or partially open, by means of a slide gate sealing system 95, 96, 97 or 98 controlled via associated motorized or air (pneumatic) or hydraulic actuators 100, 101, 102 or 103 that are computer controlled from the computer 23, via electrical or other control lines 104, 105, 106 or 107, which the computer will control depending upon the presence of the bed 116 of a truck 26 beneath a given bin, from which it is desired to dispense biosolids sludge into the bed of the truck 26. Additionally, the dispensing of sewage sludge from any of the bins by opening its associated slide gate sealing system will be dependant upon the location of a truck bed beneath an appropriate bin, from which biosolids sludge is to be discharged. The bins of FIGS. 5A, 5B and 5C similarly have discharge openings 88', 88" and 88''' respectively.

Figure 6:
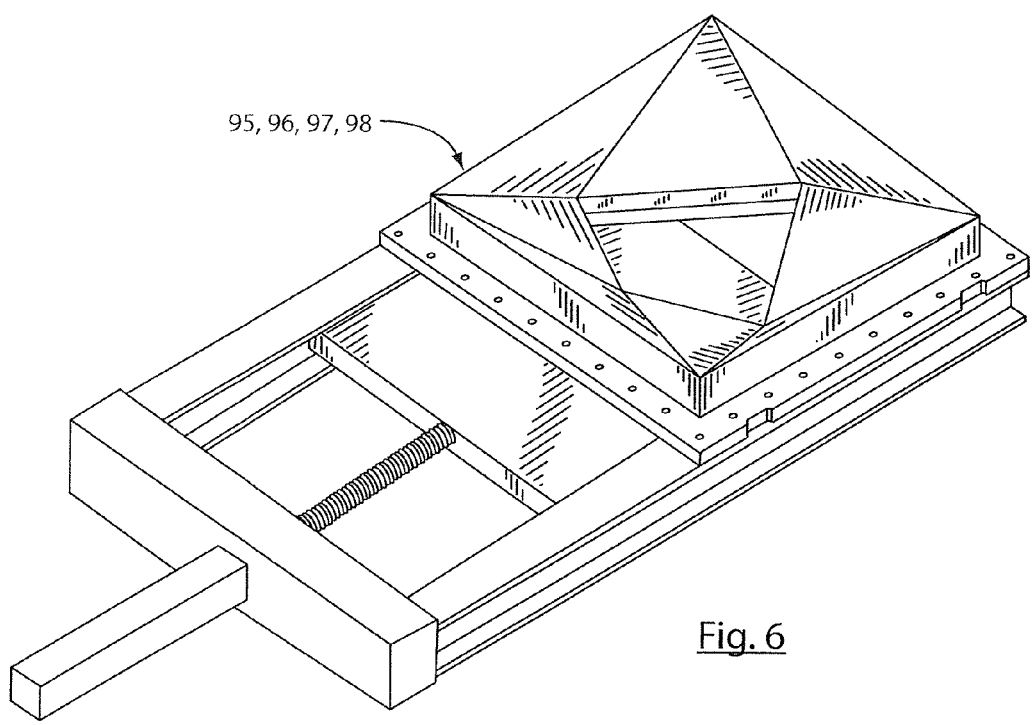
FIG. 6 is a top perspective view of a bin lower discharge gate, taken generally along the line VI-VI of FIG. 1.

The slide gate sealing systems 95, 96, 97 and 98 are illustrated in FIG. 6, and may be constructed in accordance with U.S. Pat. No. 6,698,766, the complete disclosure of which is herein incorporated by reference, or by any other suitable slide gate for discharging sludge that can have its operation controlled.

Within the garage 10, there are a plurality of location sensors 108, 110, 111, 112 and 113, for sensing the location of the beginning 114 and ending 115 of a truck bed 116, so that the computer 23 can control the exact position of a truck bed 116, as may be desired and as the computer controls such position of the truck bed 116 beneath one or more appropriate bins from which biosolids sludge is desired to be dispensed, into said truck bed 116. The sensors 108, 110, 111, 112 and 113 (or others) are connected to the computer 23 via suitable electrical or other signal lines 120, 121, 122, 123 or 124, respectively, and deliver the sensed information from the respectively associated sensors 108, 110, 111, 112 and 113 to the computer 23, and can communicate to the driver of the truck 26 whether or not to move the truck in one direction or the other, by means of a traffic control light 125 via a signal delivered from the computer 23 to an electrical or other control line 126 connected to the traffic control light system 125. It will be apparent that a plurality of traffic control light systems 125 may be used at various locations within the garage, from the inlet end to the exit end thereof, as may be desired.

When any given slide gate 95, 96, 97 or 98 is opened to allow for discharge of biosolids sludge into a truck, it is desired that the rate of opening be carefully controlled, so that there is not suddenly too much sludge dumped into the truck, which could cause damage to the truck, truck bed or the like, such as, but not limited to the breaking of a truck axle upon receiving the impact of a sudden weight of a great amount of sludge. Accordingly, when any of the gates 95, 96, 97 or 98 are to be opened, the computer is programmed to first open them gradually, and then increase the rate of opening, until they are fully open. Similarly, when it is desired to close any of the gates 95, 96, 97 or 98, the rate of closing will likewise be carefully controlled by the computer 23.

Figure 2:
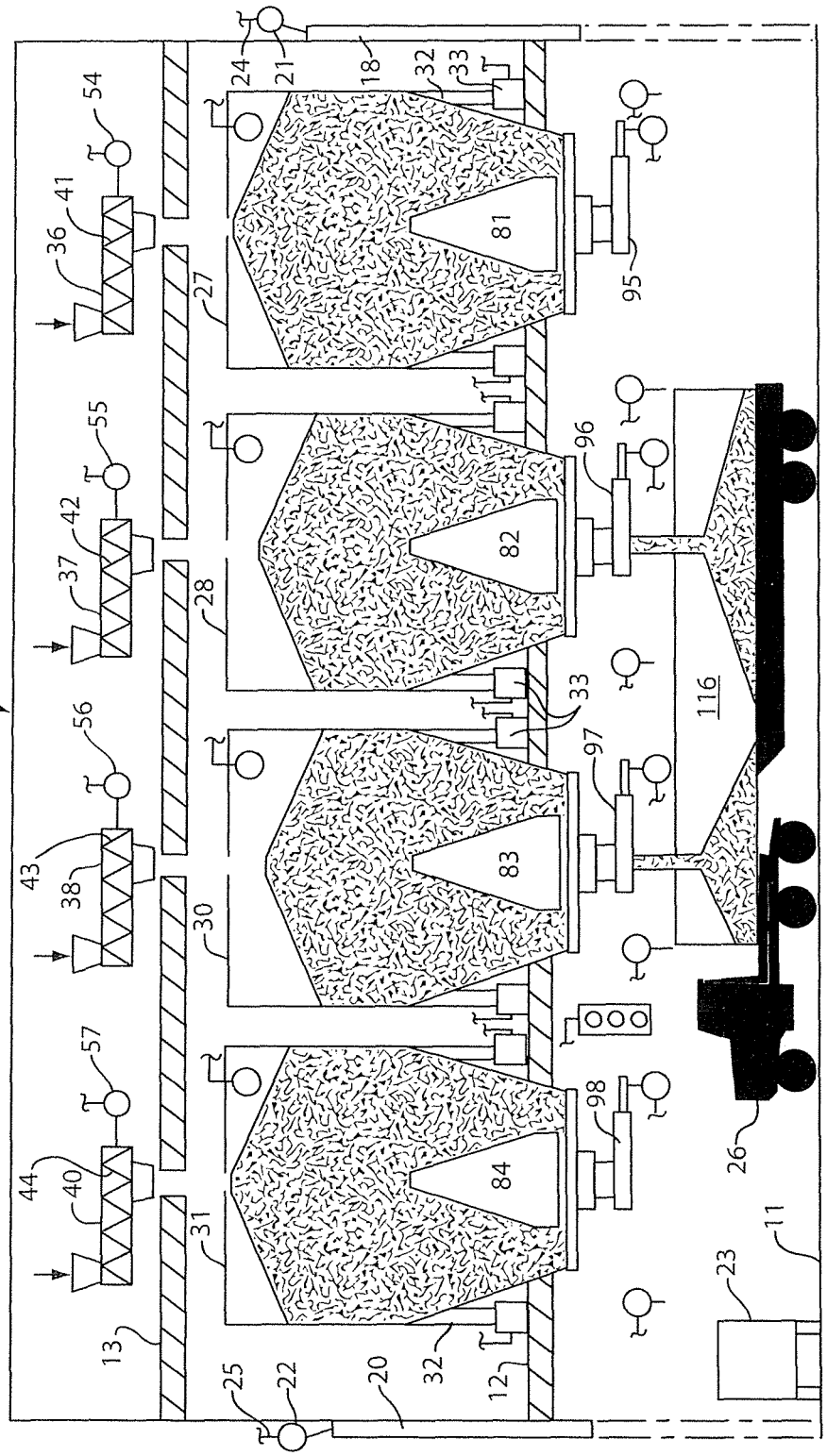
FIG. 2 is a view similar to that of FIG. 1, illustrating the discharge of biosolids sludge from some of the bins, into the bed of a truck, based upon the opening of discharge gates at the lower ends of selected bins from which the sludge is to be discharged.

With reference now to FIG. 2, it will be seen that the truck is situated so that its bed 116 is disposed beneath bins 28 and 30, and that the volume of biosolids sludge in each of those bins has been reduced somewhat from the volume that was present in those bins, as illustrated in FIG. 1, due to the fact that the discharge gates 96, 97 at the bottom of respective bins, 28, 30 are opened, dispensing biosolids sludge into the bed 116 of the truck, at two locations.

In FIG. 2, it will be seen that the discharge of biosolids sludge from the conveyor devices 36, 37, 38 and 40, into the bins 27, 28, 30 and 31 has been discontinued, due to the computer 23 having shut off operation of the auger drive actuators 54, 55, 56 and 57, thereby discontinuing the operation of the respective sludge-handling augers 41, 42, 43 and 44.

Figure 3:
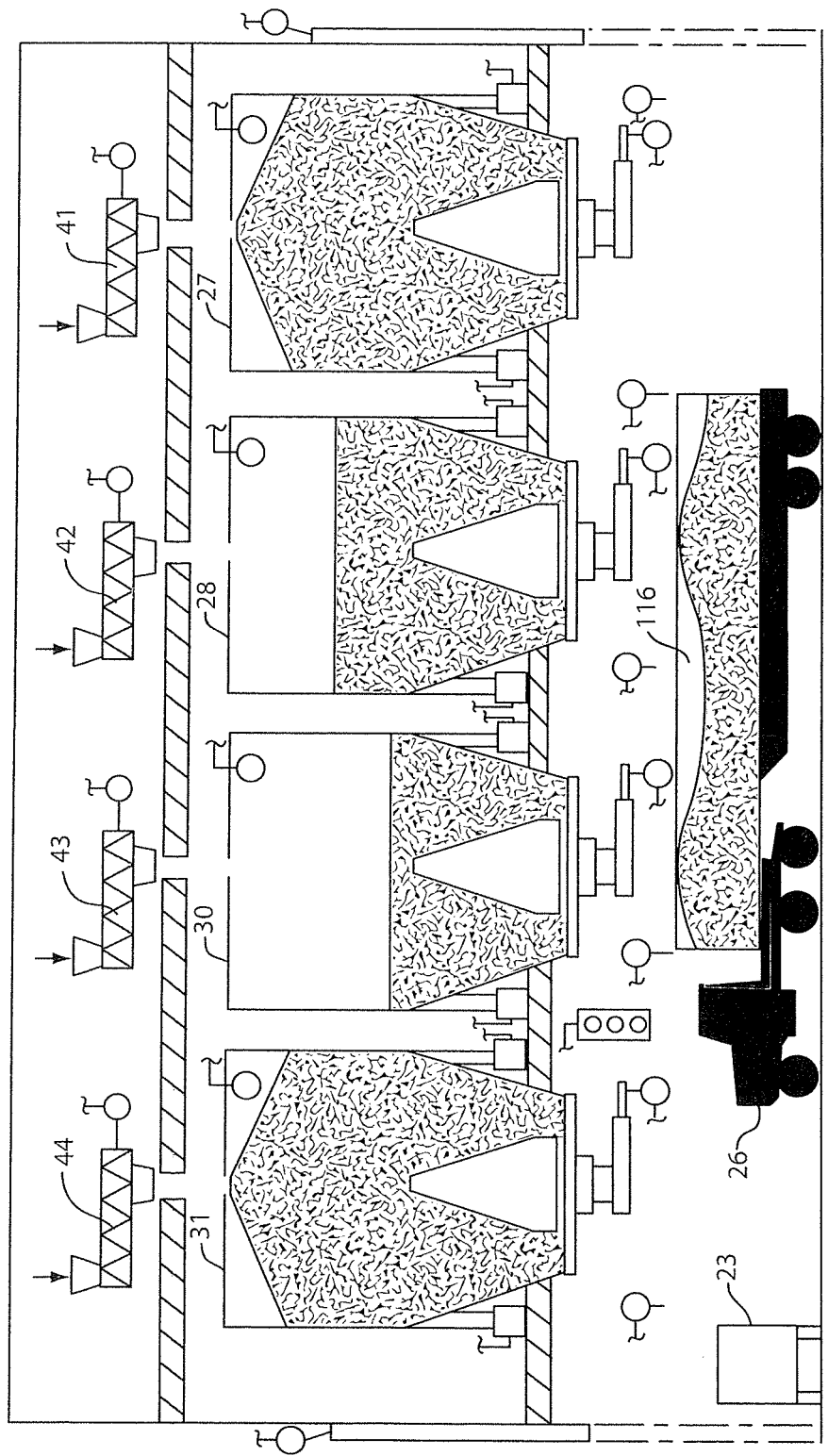
FIG. 3 is an illustration similar to that of FIGS. 1 and 2, but wherein the bed of the truck has been filled to a desired set point, and wherein a reduced supply of biosolids sludge in two of the bins is present, due to the discharge of the biosolids sludge from those bins, into the truck bed.

Also, with reference to FIG. 3, it will be seen that biosolids sludge from the bins 28 and 30 has been discharged into the bed 116 of the truck 26, such that the bed 116 of the truck 26 is now substantially full, at least to the desired "set point", or number of pounds desired in the bed, closely controlled, to be within a few pounds of the desired set point, which set point may be on the order of perhaps fifty thousand pounds, which loading of the truck bed can be accomplished within an efficient period of time, due to the accurate control of the various systems described above, such as the filling of the bins, the openings of the discharging slide gates, the positioning of the truck 26, as well as the optional sensing of the height of biosolids sludge within a given bin, at any given time, all computer controlled.

It will further be understood that the load cells 33, with respect to any given one of the bins 27, 28, 30 or 31 may detect a change in the weight of the biosolids sludge in any particular one of the bins, over a period of time. That is, because there is a certain amount of liquid in the biosolids sludge in the bin at any given time, that amount of liquid will not generally be a constant. Rather, over night, or at times over the course of a weekend or other period of time, bio solids sludge in one or more of the bins may have its water component partially evaporate. However, the weight that is then fed to the computer 23 by the load cells 33 associated with any given bin, will communicate that change in weight to the computer 23, so that the opening of an associated slide gate can be controlled to effect the discharge into the truck bed 116 of a desired weight of biosolids sludge, as distinguished from merely a certain volume of biosolids sludge. Thus, the weight of material being discharged into the bed 16 of a truck is controlled, as a safety feature, so as not to overload a truck bed, beyond the desired weight that is selected for any given truck at any given time.

Figure 4:
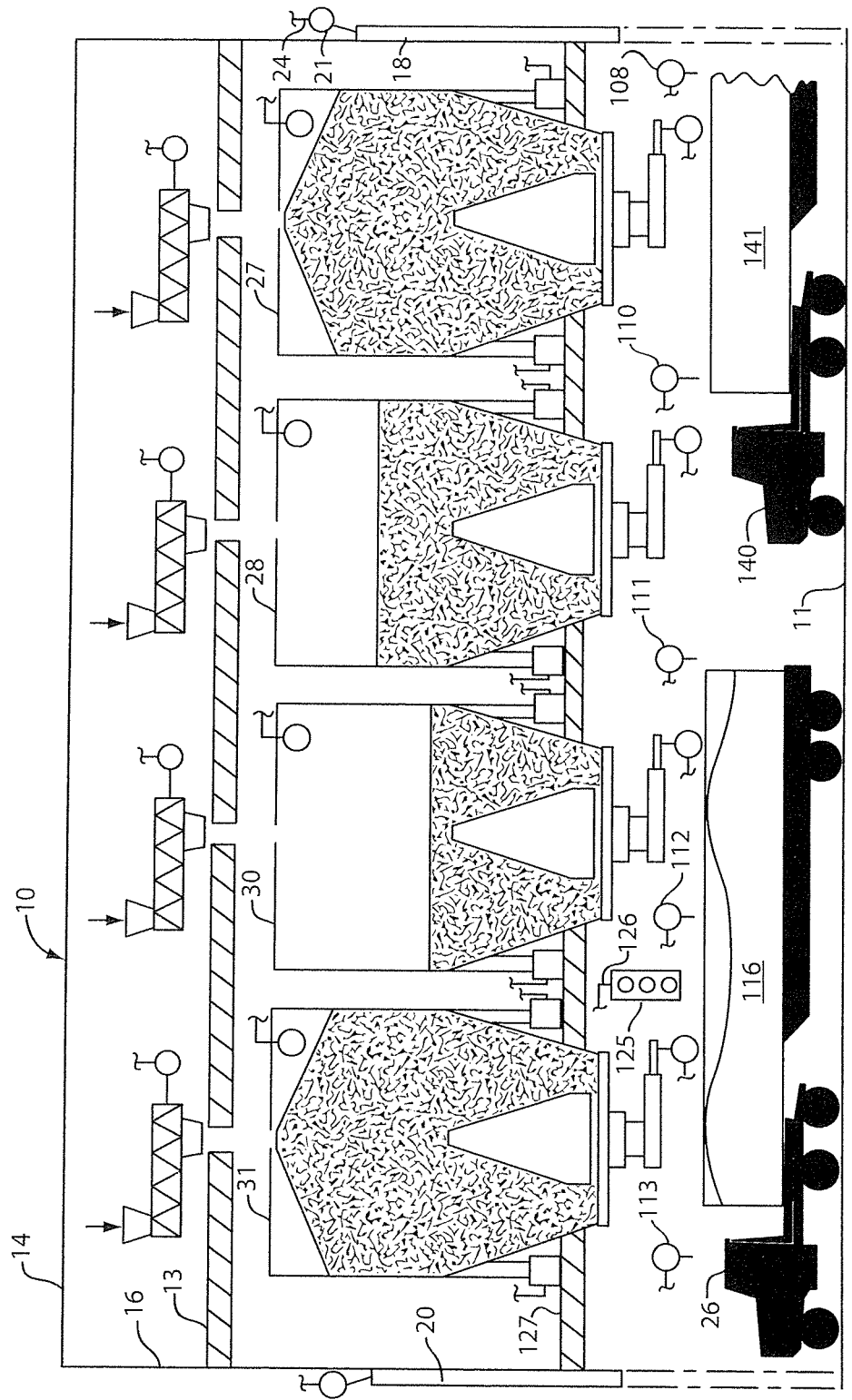
FIG. 4 is an illustration similar to that of FIGS. 1-3, but wherein the first truck of FIGS. 1-3 is being signaled to leave the garage via the open left gate, and wherein the computer control is directing a second truck to enter from the right, into the garage, through a computer-opened door.

With reference now to FIG. 4, it will be seen that sufficient biosolids sludge has been dispensed from the bins 28 and 30, to fill the bed 116 of the truck 26 of FIG. 3, and the computer 23 has now delivered a signal via electrical traffic control line 126, to the traffic control signal 125, to inform the driver of the truck 26 that the filling operation is complete, and that the driver can drive the truck 26 leftward as shown in FIG. 4, out beneath the exit door 20, which has been raised from a lowered position shown in phantom in FIGS. 1-4 to the full line open position shown in FIG. 4, so that the truck 26 carrying its bed 116 can now pass out the exit end 16 of the garage, beneath the door 20.

The computer 23 may then deliver a signal to the entry door actuator 21 via electrical control line 24, so that the entry door 18 is raised from a closed phantom position shown at the right end of FIG. 4, to an open full line position, to admit another truck 140 with its bed 141, into a predetermined position beneath one or more of the bins 27, 28, 30 or 31, as determined by the computer based upon placement information provided by one or more of the various location sensors 108, 110, 111, 112 and/or 113, in much the same manner as has been described above, in connection with the description provided with reference to FIG. 1.

In FIG. 7, there is a fragmentary illustration of the bins 28, 30 of FIGS. 1-4, with the alternative conveyor devices in the form of pumps 37', 38', controlled by motor/controllers 55', 56' via control lines 60', 61', with the pumps 37', 38' receiving dewatered sludge via lines 51', 52', and pumping the same via conduits 64', 65', respectively, through the floor 13, into respective bins 28, 30.

As aforesaid, the cones 82 are mounted via mounting struts 79, to the inside of the sloped walls 85 of the bins 28, 30.

Figure 9:
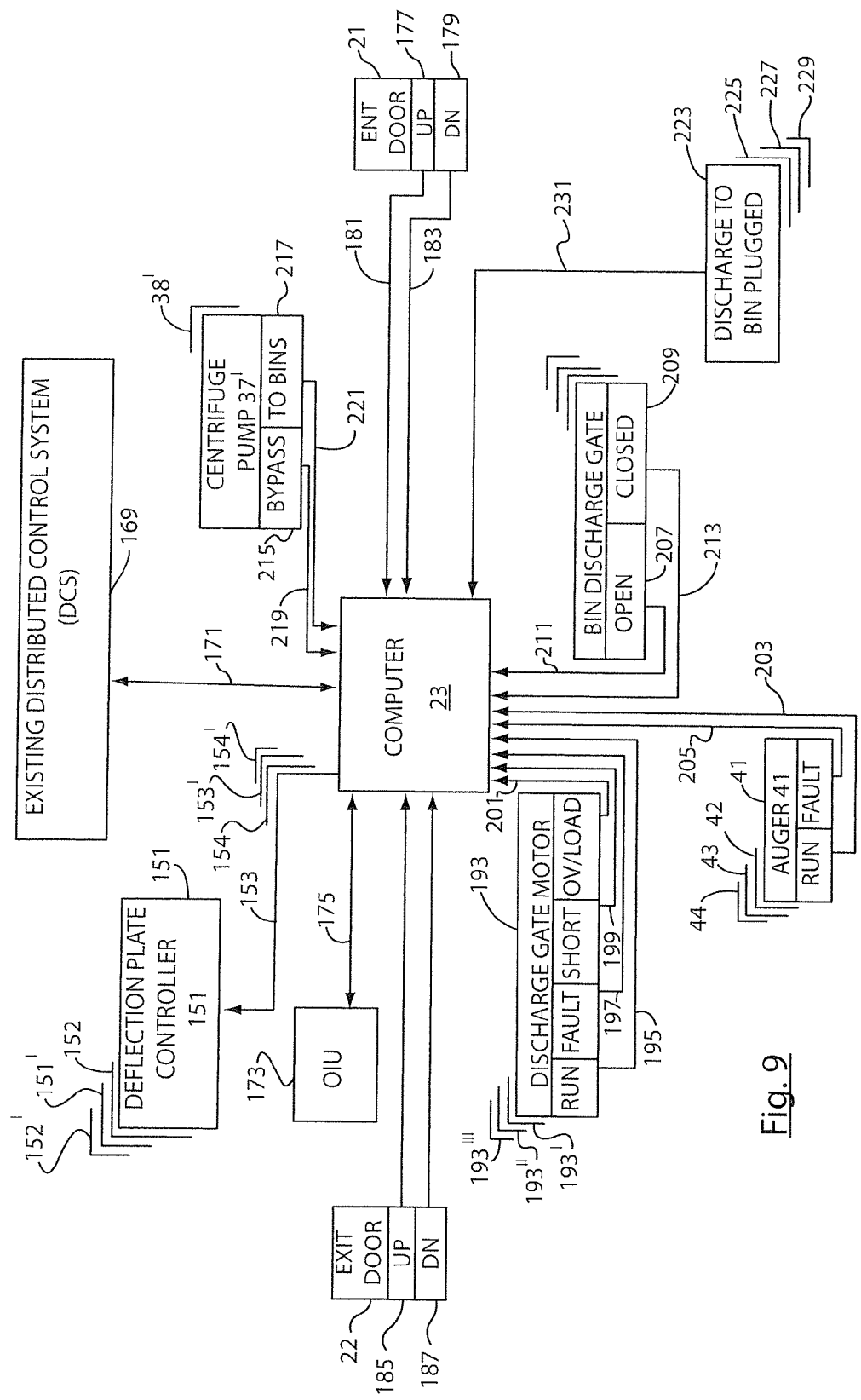
FIG. 9 is a circuit block diagram for the computer interface with the existing distributed control system, and in the present invention, with respect to the operator interface unit, the deflection plate controller and various sensors.

Beneath the bins 28, 30, as shown in FIGS. 7 and 9 only, there are provided deflector devices in the form of plates 150, or chutes or other deflector means, controlled via suitable controllers 151, 152, 151', 152' via control lines 153, 154, 152', 154' with the deflector plates 150 being pivotally movable between the full line positions therefore illustrated, and the phantom line position illustrated at the bottom of bin 30, for selectively controlling operation of the deflector plates 150, to deflect sludge from a location just beneath the bins, to a location fore or aft of the bed 116 of a truck disposed beneath bin(s). These deflector devices minimize splatter when sludge is being delivered from a bin to the bed of a truck. This also allows for further control of placement of sludge being delivered into a truck bed 116, such as, more toward the center of the bed of the truck bed, or otherwise, as may be desired.

Figure 8:
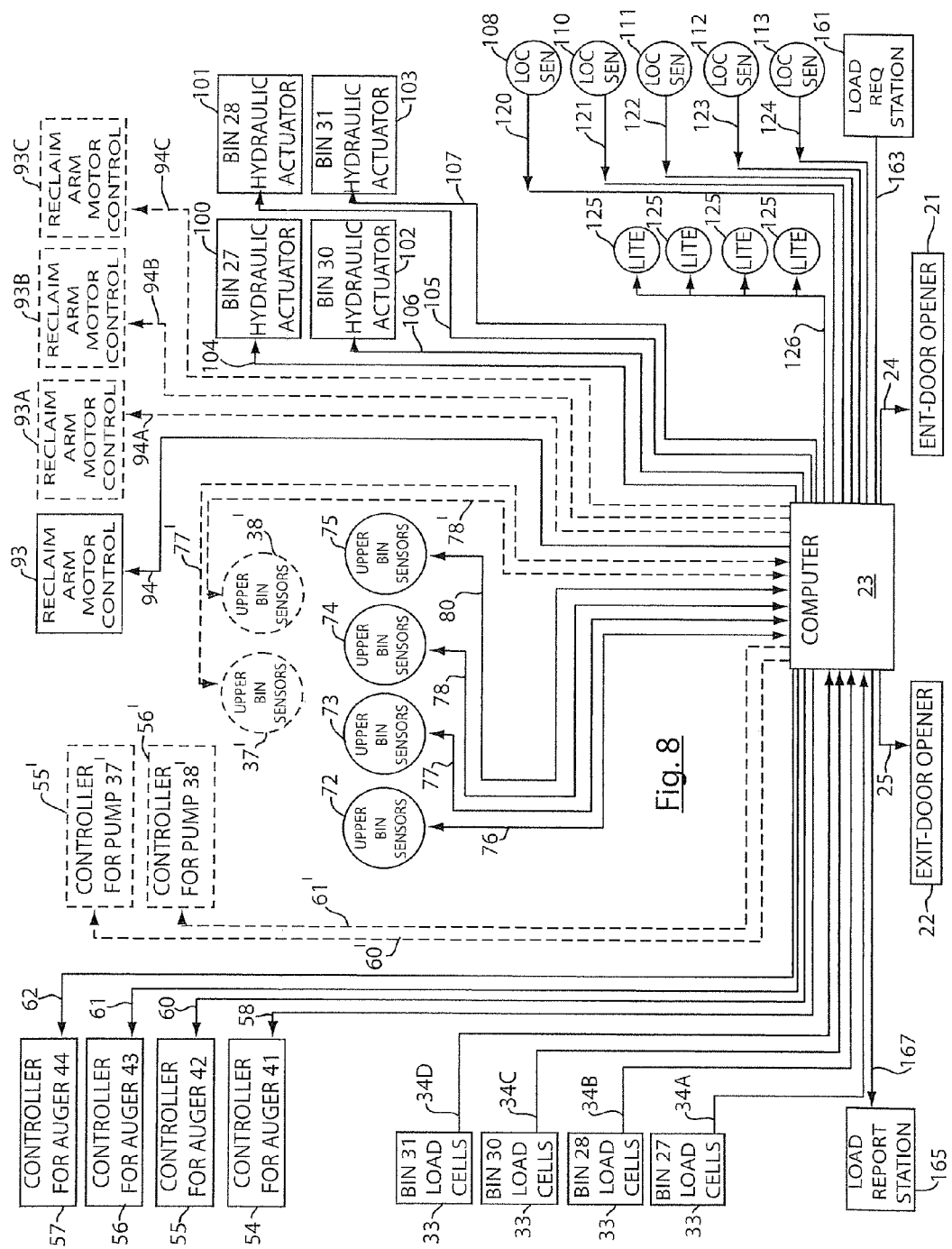
FIG. 8 is a circuit block diagram of the computer control of components of the invention.

Regarding the circuitry shown in FIG. 8, it can be seen that the computer 23 receives a load request from a truck driver at a load request station 161 via the signal line 163. After the truck is loaded and the driver is ready to exit, the computer 23 sends a load report to the load report station 165 via the signal line 167. For a truck to enter the garage, the entrance door opener 21 is operated via the line 24 from the computer 23. For a truck to exit the garage, the exit door opener 22 is operated via the line 25 from the computer 23.

A truck to be loaded with sludge is directed by the computer 23 to one or more of the bins by a plurality of traffic lights 125, the operation of which is controlled from the computer 23 by the control line(s) 126. To assist the computer 23 in knowing where a truck is located, the plurality of location sensors 108, 110, 111, 112, 113, provide signals of where the front and rear of the truck are positioned via the signal lines 120, 121, 122, 123, 124.

As previously stated, the goal of the invention is to deliver sludge on a first-in-first out basis. That means that if the oldest sludge to fill a truck is not available from a single bin 27, 28, 30, 31, the truck is sequentially directed to one or more of the other bins 28, 30, 31 with the next oldest sludge until it is filled.

The loading of a truck is monitored and calculated by the computer 23 using load cell 33 information from a respective bin 27, 28, 30, 31 being discharged. The real-time weight change in the sludge in the discharging bin is conveyed via a respective signal line 34A, 34B, 34C, 34D, connected to the load cells for the discharging bin.

At any time, i.e., during a discharge, or during a bin in static state, each of the bins 27, 28, 30, 31 may be loaded via a respective conveyor 36, 37, 38, 40 under the movement of a respective auger 41, 42, 43, 44. These augers each have a respective controller circuit 54, 55, 56, 57 operating a respective auger drive motor. The augers 41, 42, 43, 44 are operated individually from the computer 23 via respective control lines 58, 60, 61, 62.

In the alternate embodiment of FIG. 7, the augers are replaced with centrifuge pumps 37', 38' used to load the various bins. The operation of these pumps 37', 38' is controlled by a respective controller 55', 56' which in turn operate responsive to control signals from the computer 23 transmitted via control lines 60', 61'.

When an auger or pump system is employed, and a bin is being loaded (charged) or discharged, the sensors 72, 73, 74, 75 on the upper bin walls are used by the computer 23 to measure the change in location of the top of the sludge "cake" in the bin. The control-signal lines 76, 77, 78, 80 are used between the computer 23 and the upper sensors 72, 73, 74, 75 to obtain real-time sludge level information for the computer 23. In the embodiment where the pumps 37', 38' are employed, the upper sensors 37', 38' provide this information via the control-signal lines 77', 78'.

With the truck in the proper position to be loaded, the computer 23 activates the appropriate slide gate 95, 96, 97 or 98 by activating the appropriate electric or hydraulic or pneumatic gate actuator 100, 101, 102 or 103, via a respective control line 104, 105, 106 or 107. Electric actuation is preferred.

The rate a gate is opened and the rate it is closed can be controlled by the computer 23 via a respective control line 104, 105, 106, 107. These control signals initiate a gate opening operation or a gate closing operation, and end the operation of the actuator when the gate is fully open or closed.

The instantaneous speed of the gate's movement changes during the gate's movement operation. It is generally some form of a bell-shaped curve.

However, the rate at which a gate is opened may be affected by the volume of sludge present in the bin. The greater the "head" of sludge, the greater the pressure on the discharge, and the slower the gate should be initially opened to reduce the "shock" discharge on the truck. The rate at which a gate is closed may be affected by the real-time flow rate of the discharge at the time. The faster the discharge rate at the time of closure, the faster the gate should be closed to meter the correct amount of discharge into a truck.

Each bin may have a reclaim arm 90 to assist in maintaining the discharge rate of the sludge, and to reduce sludge build up on the side walls of a bin. Each reclaim arm 90 is driven by a motor which has a motor control circuit 93, 93A, 93B, 93C directing its operation via respective control lines 94, 94A, 94B, 94C from the computer 23.

FIG. 9 shows further circuit connections for the computer 23 interface with the existing distributed control system (DCS) 169. This connection is a bi-directional signal and control bus 171 which permits the interchange of information between the computer 23 functions, the discrete dedicated controller functions of the DCS 169 and the manual overrides.

Computer 23 also has a bi-directional signal and control bus 175 connection with an operator interface unit (OIU) 173. The OIU 173 provides supervisory access to the computer 23 to modify/update functions or parameters.

The deflection plate 150 at each bin discharge is controlled by a respective deflection controller 151, 152, 151', 152' pursuant to signals from the computer 23 via control lines 153, 154, 153', 154'. These signals control each deflection plate 150 to extend and to retract, and when in the extended position to move to deflect sludge to the front or to the rear of the truck bed.

In addition, various sensors provide information to the computer 23 on the status of the system, FIG. 9. The entrance door opener 21 has a door up sensor 177 and a door down sensor 179 which communicate with the computer 23 via lines 181, 183. If neither the up or down positions are detected, the door is either moving or jammed. Likewise, the exit door opener 22 has a door up sensor 185 and a door down sensor 187 which communicate with the computer 23 via lines 189, 191.

It is also vital for the computer 23 to know of the status of the discharge gates, augers, centrifuge pumps, and the bin charging openings in response to its control signals. Each discharge gate motor 193, 193', 193'', 193''' provides a run, fault, short, or overload signal to the computer 23 via signal lines 195, 197, 199, 201. Each of the augers 41, 42, 43, 44 provides a run or a fault signal to the computer vial signal lines 203, 205.

A discharge gate open sensor 207 and closed sensor 209 provide status signals to the computer 23 via signal lines 211, 213. Sensors 215, 217 at the discharge gate of each centrifuge pump 37', 38' provide status signals to the computer 23 as to whether the pumps are in by-pass mode or pumping to the bins 27, 28, 30, 31. A by-pass sensor 215 is connected to the computer 23 via signal line 219, with a pumping to bins sensor 217 connected to the computer 23 via signal line 221.

A further sensor 223, 225, 227, 229 is positioned at the discharge chute into each bin. These sensors are connected to the computer 23 via signal lines 231 and inform the computer when a bin feed chute is plugged.

Figure 10:
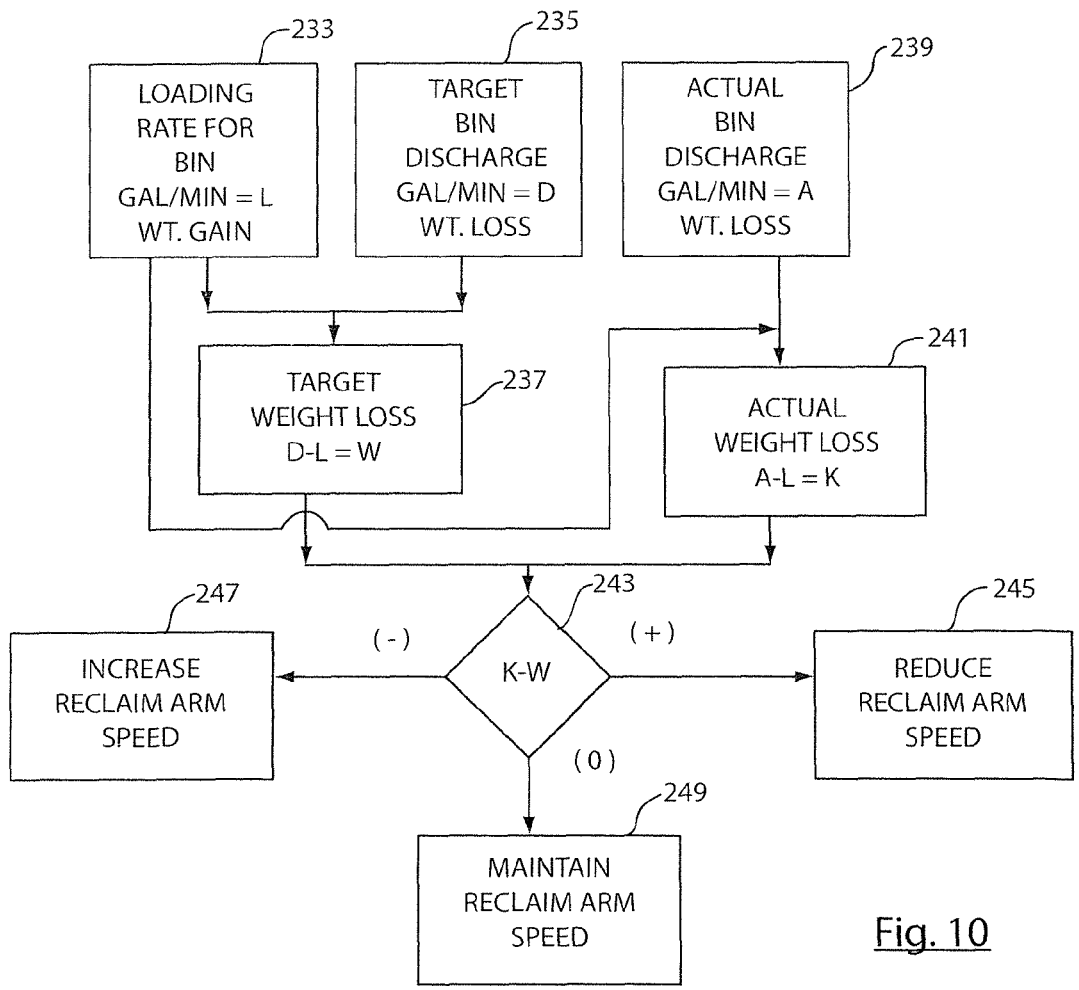
FIG. 10 is a logic diagram for determining "K" factor and controlling the reclaim arm speed in the present invention.

The system develops a "K" factor which is used to adjust the speed of the reclaim arm or other scraping mechanism via a variable speed drive (VFD) to offset the friction of sludge against the wall of a bin, FIG. 10. The computer 23 monitors the loading rate for a bin (L) 233 and calculates the target (or theoretical) bin discharge rate (D) 235. It then calculates a target (theoretical) bin weight loss (W) under the current discharge conditions 237. The actual bin discharge weight loss is monitored/sensed (A) 239. Then the actual weight loss under discharge conditions where the bin may also be simultaneously charging is calculated (K) 241.

The actual discharge rate (K) is then compared against the target (theoretical) discharge rate (W) 243. If K exceeds W, the reclaim arm speed is reduced 245. If W exceeds K, the reclaim arm speed is increased 247. If K equals W the current state of the reclaim arm (speed and operation) is maintained without change 249.

This calculation and control adjustment of the reclaim arm speed can be repeated at any frequency interval chosen by the operator depending upon ambient conditions, sludge status and other factors.

A primary purpose of the computerized system of the present invention, as previously stated, is to manage inventory control for the first-in, first-out delivery of sludge in order to minimize sludge "residence" in any of a plurality of bins and the attendant issues with overly aged sludge. Information needed to manage inventory within a plurality of bins 27, 28, 30, 31, FIG. 11, includes when and how much is charged into each bin, and when and how much is discharged from each bin.

First, the day and time of day of charging of each bin, and the charging rate and the length of charging time is monitored for each bin. This provides the system with the size and age of a charge. Optionally, it may be available for the operator to select the size of a charge for age monitoring.

Second, the day and time of day of a discharge, and the discharge amount is monitored for each bin.

With this information, the computer system monitors the "aged" condition of the contents of each bin in sequential layer order; and can determine which bin or bins to discharge next; how much to discharge from each bin. If the requested discharge amount is not available with the selected "age" in a single bin, the selects the next "aged" bin from which to discharge to complete a load request, provided that bin is down line from the first bin discharged. If it is not, then the subsequent aged bin is selected down line to complete the discharge.

Figure 11:
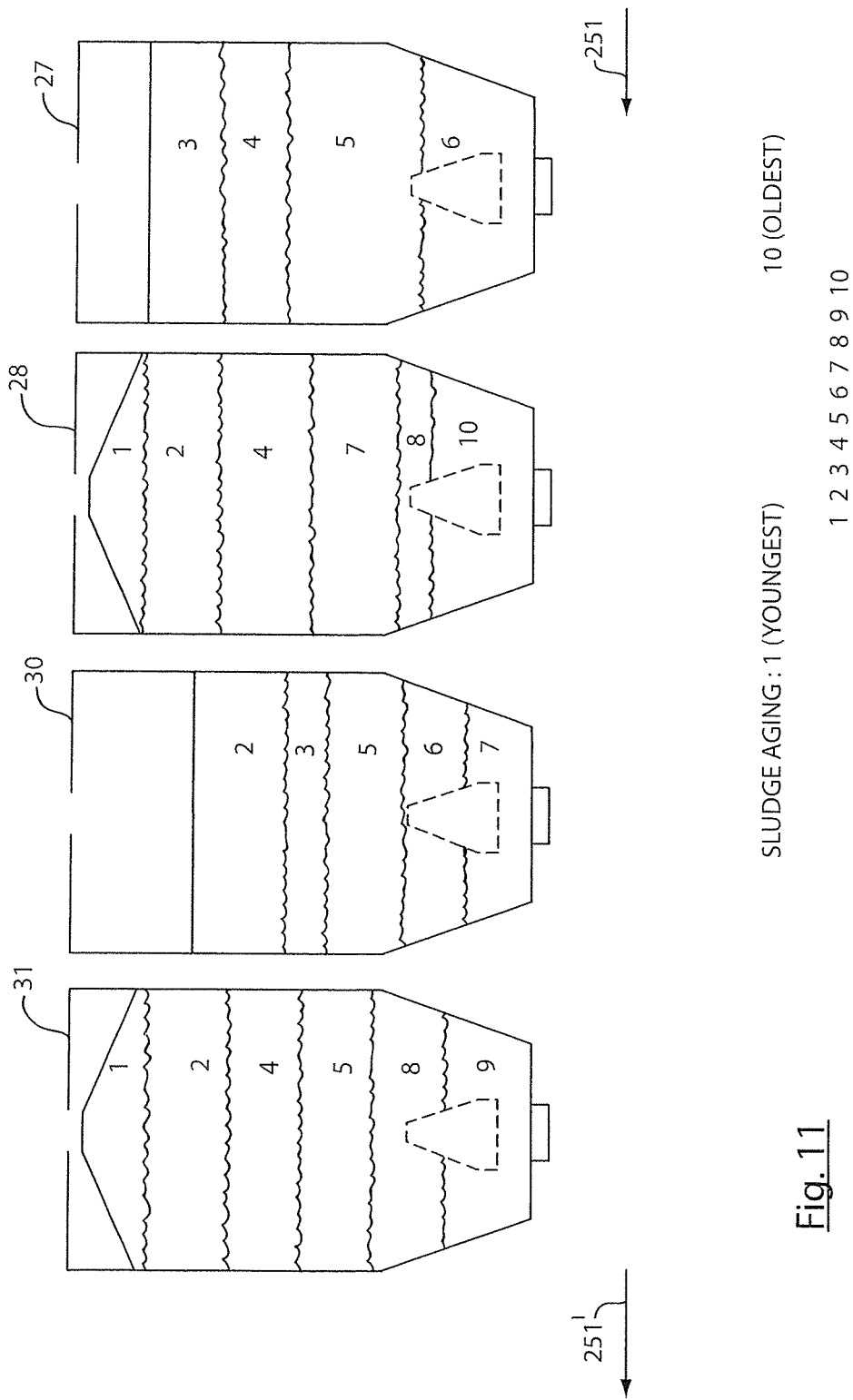
FIG. 11 illustrates the computer "tracking" of sludge aging amongst a four-bin example of the invention.

FIG. 11 shows an example of aged inventory in each of the four bins 27, 28, 30, 31, with bin 27 being the first in line closest to the entrance door and bin 31 being the last down line.

Referring to FIG. 11, the arrows 251, 251' show the direction of travel for a truck. The system would select the second bin 28 to begin to load the truck's request. If the quantity of "10" aged sludge satisfied the request, the truck would exit the facility. If that quantity was insufficient, the truck would then be directed to the fourth bin 31 to complete its load with "9" aged sludge, and other aged sludge from bin 31 as needed.

If a second truck enters a load request, it would be directed to the second bin 28, unless the quantity of "8" aged sludge in bin 28 was insufficient to fill the load request and the quantity of "8" aged sludge in bin 31 was sufficient. If the quantity of "8" aged sludge in bin 31 was insufficient, the second truck would first be directed to the second bin 28 and then to the fourth bin 31.

Figure 12:
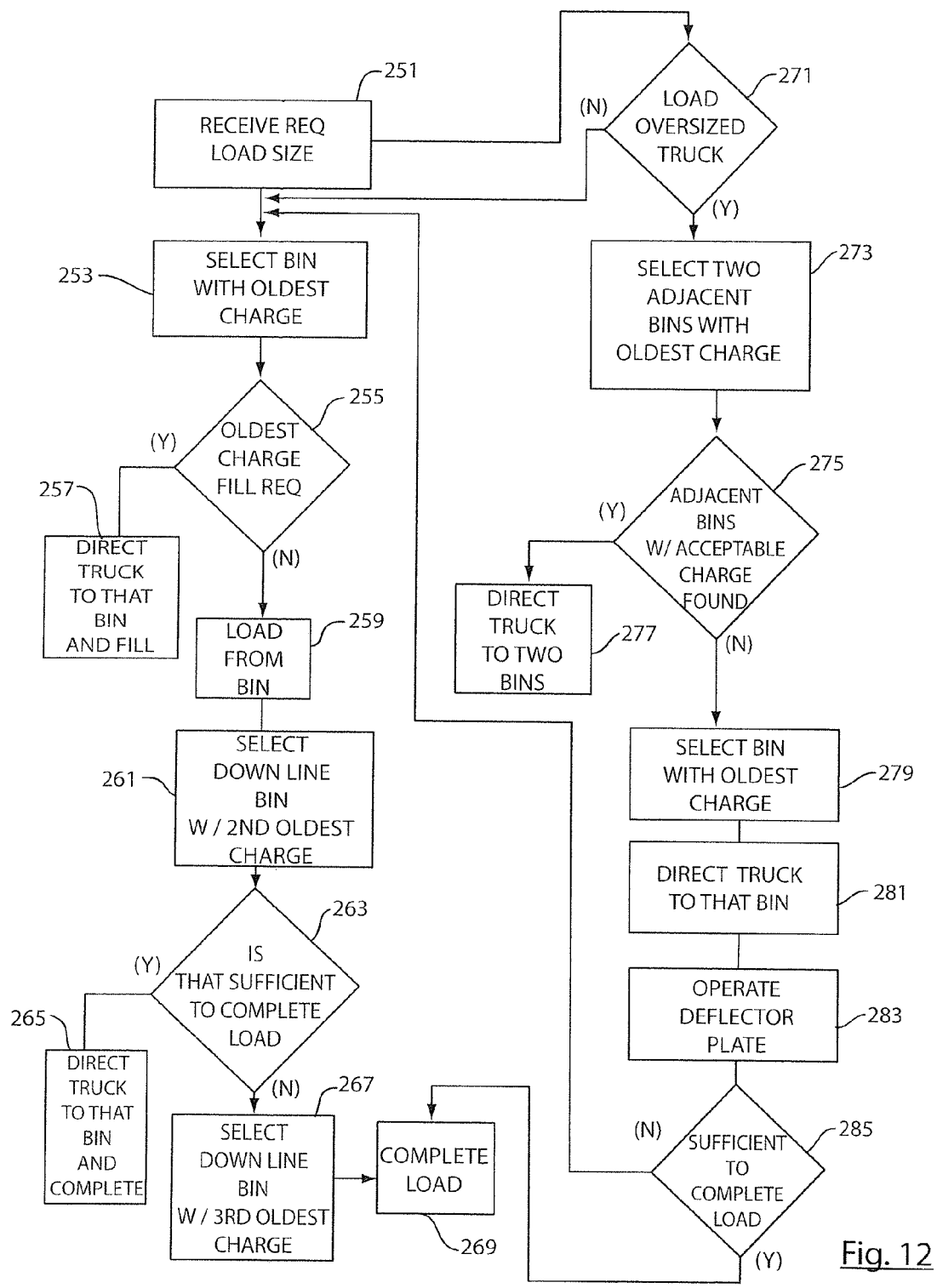
FIG. 12 is a logic flow chart for aged inventory control for the inventory management of the invention.

FIG. 12 shows logic steps performed by the computer system for the aged inventory management of the present invention for a garage with four bins 27, 28, 30, 31 as shown in FIG. 11.

When a request for a load size is received 251, FIG. 12, a bin is selected with the oldest charge 253. It that charge will fill the request 255 the truck is directed to that bin and the load is filled 257. If the charge is not sufficient 255, the oldest charge is loaded from that bin 259 and then a down line bin with the second oldest charge is selected 261. If that second oldest charge is sufficient to complete the load 263 the truck is directed to that bin and the load is completed 265.

If that second oldest charge is insufficient 263 to complete the load, a down line bin with the third oldest is selected 267 and the loading is completed 269.

When a request for a load size is received 251, the system calculates if the size of the load indicates an oversized truck 271. If not, then a bin with the oldest charge is selected 253. If it is determined that the truck is oversized 271, a search is conducted for two adjacent bins with the oldest charge 273, and an inquiry is made to determine if the charge held in the two bins is acceptable to fulfill the load requirements 275. If it is, the truck is directed to a location to straddle the two bins 277. If such two adjacent bins are not found 275, the bin with the oldest charge is selected 279 and the truck is directed to that bin 281. At that location the discharge deflector plate 150 is operated as needed to evenly load the truck 283. If the inventory of that bin is sufficient to complete the load 285 the loading is completed 269. If it is insufficient 285 a down line bin with the oldest charge is selected 253 and the operational sequence continues from there.

It is understood that the sequence of logical operations can be varied without departing from the intent and scope of the invention. The logical steps and their sequence shown in FIG. 12 are but a single example of the implementation of inventory management contemplated by the present invention.

It will thus be apparent that the present invention provides the operator of an installation 10 for an automated discharge of treated sewage sludge to trucks with a precision truck loading system, to give one the ability to automatically load trucks precisely and cleanly, with little or no regular maintenance, through the use of an inventory management system, and automatic truck positioning system, and a precision truck loading system, such that biosolids sludge or "cake" is loaded into the bins in a generally first-in, first-out basis, to minimize compaction, odors and the re-growth of pathogens. In doing so, the trucks are directed into position based on a selected operating protocol, determined by the operator of the automated discharge system for delivering treated sewage to trucks. This allows the operation to be controlled by the system operator, such that the driver of the truck need only select the desired weight and initiate operation by starting the discharge from the bin or bins by simply activating a push button or other "start" control on the computer.

It will be apparent that the system described above avoids having the sludge or "cake" sit at rest too long in the bin. By the computer control of the system, such allows the software that operates the computer to select the proper bins, as well as to guide and center the truck bed under an appropriate bin or bins, while minimizing the need for operator interface. By proper positioning the bed of the truck under a desired bin, as well as by controlling the discharge from the bin, the splashing of sludge can be minimized, or eliminated.

In accordance with this invention, the various controls of the various operational mechanisms via the computer allow for the computer to retain such information, and to utilize that information that is gained to later effect various enhancements.

It will be apparent from the foregoing the various modifications may be made in the apparatus described above, as well as in the use and operation of the same, including in the process steps, as may suggest themselves to those skilled in the art, upon a reading this specification, all within the spirit and scope of the present invention, as defined in the appended claims.

What is claimed is:

1. A method of inventory management of sludge for discharge into trucks from a plurality of storage bins, comprising the steps:
   charging sludge into each bin while monitoring each charge for day and time of day charged;
   inventorying each sludge charge held in each bin by age; and
   discharging from said bins in order oldest sludge first;
   wherein further sludge discharges are in sequential order of descending age of each sludge charge.

2. The method of claim 1, wherein each of the steps of inventory management are conducted automatically via the control of a programmable logic computer.

3. A method of controlling the operation of a sludge discharge assisting arm at the discharge outlet of a sludge bin, wherein sludge is charged into the top of said bin while sludge is discharged into a truck from the bottom of said bin, comprising the steps:
   determining the charging rate of sludge into said bin;
   calculating the target-theoretical sludge discharge rate based upon the charging rate of sludge into the bin;
   determining the actual sludge discharge rate;
   calculating if the actual sludge discharge rate is greater, less or equal to the target-theoretical discharge rate; and
   decreasing or increasing said sludge discharge assisting arm operation speed in response to the actual discharge rate being greater or less than the target-theoretical discharge rate.

4. The method of claim 3, wherein each of the steps of controlling the operation of said sludge discharge assisting arm are conducted automatically via the control of a programmable logic computer.

5. A method of allocating a bin for sludge discharge into a truck in a system having a plurality of sludge storage bins, comprising the steps:
   inventorying the sludge held in each bin by residence time age;
   receiving a request for sludge from said truck;
   directing said truck to the bin with the oldest age sludge; and
   loading said truck from said bin with said oldest age sludge.

6. The method of claim 5, wherein each of the steps of allocating a bin for sludge discharge are conducted automatically via the control of a programmable logic computer.

7. A method of allocating a bin for sludge discharge into a truck in a system having a plurality of sludge storage bins, comprising the steps:
   inventorying the sludge held in each bin by residence time age;
   receiving a request for sludge from said truck;
   directing said truck to the bin with the oldest age sludge; and
   loading said truck from said bin with said oldest age sludge,
further including the steps:
   determining if said oldest age sludge filled said truck;
   directing said truck to another bin with next oldest age sludge if said oldest age sludge did not fill said truck; and
   complete filling said truck with said next oldest age sludge.

8. The method of claim 7, wherein each of said method steps are conducted automatically via the control of a programmable logic computer.

* * * * *